H. L. ALDER & H. E. GILFERT.
ANTIFRICTION HUB.
APPLICATION FILED JAN. 25, 1913.
1,190,258.
Patented July 11, 1916.
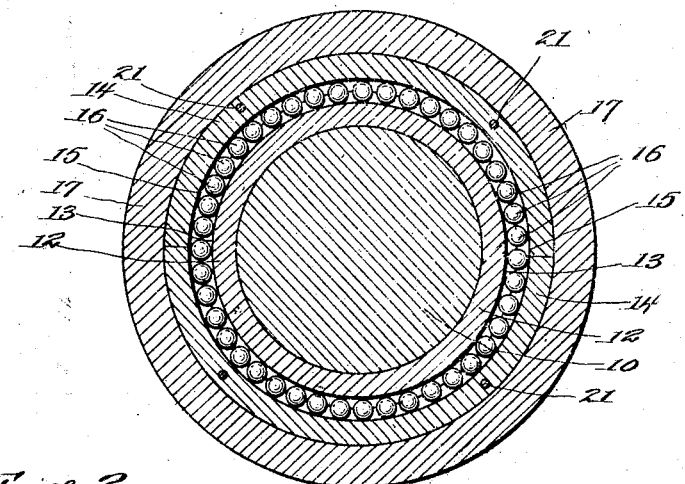
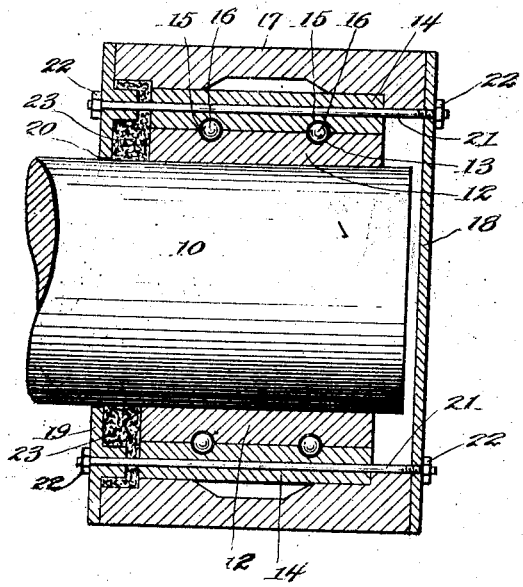
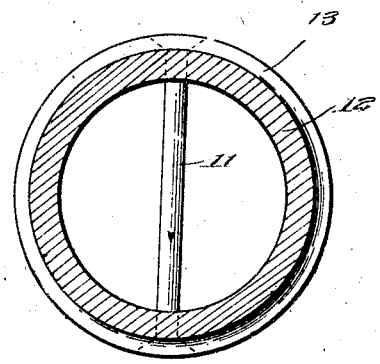
WITNESSES
INVENTORS
Harry L. Alder
Henry E. Gilfert
Attorney

UNITED STATES PATENT OFFICE.

HARRY L. ALDER AND HENRY E. GILFERT, OF STOCKTON, CALIFORNIA.

ANTIFRICTION-HUB.

1,190,258.

Specification of Letters Patent.

Patented July 11, 1916.

Application filed January 25, 1913. Serial No. 744,076.

*To all whom it may concern:*

Be it known that we, HARRY L. ALDER and HENRY E. GILFERT, citizens of the United States, residing at Stockton, in the county of San Joaquin and State of California, have invented new and useful Improvements in Antifriction-Hubs, of which the following is a specification.

Our invention, as disclosed herein, relates broadly to an improved anti-friction hub, that is a hub wherein loss of energy due to friction is reduced to the minimum.

An object of our invention is to provide a hub of the type aforesaid, wherein the bearings are disposed in such a manner as to be obviously excluded from dust or foreign materials of any nature.

Another object of our invention lies in the provision of a device of the above character wherein the engaging members are readily detachable from the device consequently facilitating the attachment of new parts when desired.

A further object of our invention is to provide an anti-friction hub, wherein the axle proper is relieved from friction generated by the rotation of the wheel to a great extent.

A still further object of our invention is to provide a device of the type above set forth which consists of but a few simple parts whereby it may be manufactured and placed upon the market at a minimum cost.

With the above and other objects in view, our invention relates to such details of construction and in the arrangement and combination of parts as will be hereinafter fully described and specifically pointed out in the appended claim.

In describing our invention in detail, reference will be had to the accompanying drawings wherein like characters denote like or corresponding parts throughout the several views, and in which:—

Figure 1, is a cross sectional view of our invention illustrated in connection with an ordinary form of axle, Fig. 2, is a vertical sectional view of our device showing the axle in elevation, Fig. 3, is a sectional view of an anti-friction bearing which is used.

In the accompanying drawings wherein is illustrated the preferred form of our invention, the numeral 10 designates an axle, of the usual form, in connection with which our invention has been illustrated but it will be appreciated that the latter may be employed in connection with axles of different other types without departing from the spirit thereof.

In reducing our invention to practice, we have provided, fixedly mounted upon the axle 10 through the medium of transversely extending counter-sunk bolts 11, an annular bearing ring 12, the latter fitting snugly about the same, as is clearly shown. While the above method of attaching the ring to the axle has proved very efficient in operation, it is to be appreciated that we are not limited to this form and may use any other form if it is desired.

Provided upon the periphery of the ring 12, and in spaced relation with each other, are as is clearly shown, ball races 13, the latter being substantially semi-circular in cross section. We have also provided, a second sectional bearing sleeve 14, which corresponds in shape, to the ring 12 and is provided upon its inner periphery with a pair of spaced apart ball races 15, the latter registering with the races 13 consequently providing an annular circular recess wherein bearing balls 16 may operate. The sleeve 14, is, as is clearly shown, disposed within a hub 17 the latter consisting of a body portion opened at each end, one end however being closed through the medium of a circular plate 18. By the provision of this plate 18, it will be recognized that dust and other foreign material is prevented from settling in the wearing parts of the bearings consequently more readily assuring the operativeness of our invention. The other end of the body portion 17 is closed through the medium of a second plate 19, which plate has a central opening provided therein for the reception of the axle 10 as is clearly shown in Fig. 2. We have now provided means for securing the plates 18 and 19 securely in engagement with the body portion of the hub and at the same time holding the sleeve 14 in rigid relation therewith.

With the above point in view, we have provided a series of transversely extending rods 21 which are screw threaded near their extremities as is shown, the screw threaded portion receiving nuts 22. The rods 21 also extend transversely through the sleeve 14 whereby as above set forth the same is held in rigid relation with the hub and allowed to rotate with the same about the ring 12.

For purpose of assuring the constant oiling of the bearings and working parts of the hub without constant attention, a quantity of oil saturated packing material 23 is disposed between the plate 19 and the edges of the ring 12 and sleeve 14. By the manipulation of the nuts 22, it will be appreciated that the packing material may be compressed so as to allow the oil in the same to flow to the bearings in the device and consequently sufficiently lubricate the same. The plate 19 is provided with enlargements 19' extending from the inner face of the plate into the space between the plate and the ring and bushing. These enlargements engage the packing 23 and prevent movement of the packing as the axle rotates.

It will be appreciated from the foregoing disclosure that our invention may be efficiently employed upon mining cars of different types in view of the fact that great difficulty is incurred in providing means for supporting the constant great weight carried therein.

Such changes as are permissible by the subjoined claim may be resorted to without departing from the spirit of our invention.

Having thus fully described our invention, what we claim as new and desire to secure by Letters Patent is:—

In a device of the character described a bushing ring, a collar rotatably mounted upon said bushing ring, anti-friction means positioned between said collar and ring, a hub fitting upon said collar and being provided at one end with an inwardly extending abutment flange engaging said collar and having its opposite end portion extending beyond the ends of said ring and collar, a plate fitting against the extending end of said hub and extending in spaced relation to said collar and bushing to provide a packing pocket, said plate being provided with a central opening positioned in alinement with the central opening of said bushing and having enlargements formed upon the inner face of said plate and extending into the space between said plate and the ends of said collar and bushing ring to provide securing means for packing plates therein, a closure plate fitting against the opposite end of said hub, and securing means extending through said collar and connected with said plates to hold the same in tight engagement with said hub.

HARRY L. ALDER.
HENRY E. GILFERT.

Witnesses:
RAYMOND J. CASEY,
LOIS MILLER